US009813218B2

United States Patent
Suzuki et al.

(10) Patent No.: US 9,813,218 B2
(45) Date of Patent: Nov. 7, 2017

(54) DUPLEX LC COMMUNICATION LIGHT DETECTING ADAPTER AND DUPLEX LC COMMUNICATION LIGHT DETECTING STRUCTURE

(71) Applicant: Hitachi Metals, Ltd., Tokyo (JP)

(72) Inventors: Kanako Suzuki, Hitachi (JP); Takao Nishikawa, Itabashi-ku (JP); Toshiyuki Suzuki, Saitama (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 14/677,838

(22) Filed: Apr. 2, 2015

(65) Prior Publication Data

US 2015/0288447 A1    Oct. 8, 2015

(30) Foreign Application Priority Data

Apr. 4, 2014  (JP) ................... 2014-077919

(51) Int. Cl.
| | |
|---|---|
| *G02B 6/38* | (2006.01) |
| *H04B 10/079* | (2013.01) |
| *H04L 5/14* | (2006.01) |
| *G02B 6/42* | (2006.01) |

(52) U.S. Cl.
CPC .............. *H04L 5/14* (2013.01); *G02B 6/3825* (2013.01); *G02B 6/3895* (2013.01); *G02B 6/4287* (2013.01); *G02B 6/4246* (2013.01); *G02B 6/4292* (2013.01)

(58) Field of Classification Search
CPC .................................. G02B 6/38; G02B 6/42
USPC ......................................................... 385/60
See application file for complete search history.

(56) References Cited

U.S. PATENT DOCUMENTS

| | | | | |
|---|---|---|---|---|
| 5,751,341 A | * | 5/1998 | Chaleki et al. | ............... 348/65 |
| 6,487,327 B1 | | 11/2002 | Mock | |
| 7,296,938 B1 | * | 11/2007 | Shapson et al. | ............... 385/92 |
| 2005/0213984 A1 | * | 9/2005 | Liu | ............... 398/139 |

(Continued)

FOREIGN PATENT DOCUMENTS

| | | |
|---|---|---|
| JP | 2001-255231 A | 9/2001 |
| JP | 2007-248732 A | 9/2007 |

(Continued)

OTHER PUBLICATIONS

Japanese Office Action dated Feb. 21, 2017 with an English translation thereof.

*Primary Examiner* — Kaveh C Kianni
(74) *Attorney, Agent, or Firm* — McGinn IP Law Group, PLLC

(57) ABSTRACT

A duplex LC communication light detecting adapter for forming two parallel optical transmission lines therein when a duplex LC connector is inserted so as to extract as a leak light a portion of communication light transmitting through the optical transmission lines, including an adapter main body that is opaque to light. The adapter main body includes a first space defined by a first wall and isolated from other spaces to arrange a first optical transmission line of the two optical transmission lines, a first light extraction hole for extracting the leak light from the first space, a second space defined by a second wall and isolated from other spaces to arrange a second optical transmission line of the two optical transmission lines, and a second light extraction hole for extracting the leak light from the second space.

8 Claims, 6 Drawing Sheets

(56) References Cited

U.S. PATENT DOCUMENTS

| | | | |
|---|---|---|---|
| 2007/0122087 A1* | 5/2007 | Levinson | ........................ 385/89 |
| 2007/0230872 A1 | 10/2007 | Suzuki et al. | |
| 2010/0008676 A1 | 1/2010 | Kojima et al. | |
| 2010/0329604 A1 | 12/2010 | Kojima et al. | |
| 2011/0200294 A1* | 8/2011 | Case | ............................ 385/135 |

FOREIGN PATENT DOCUMENTS

| | | |
|---|---|---|
| JP | 2009-103837 A | 5/2009 |
| JP | 2009-145676 A | 7/2009 |
| JP | 2010-231082 A | 10/2010 |
| JP | 2011-013359 A | 1/2011 |
| JP | 2011-013360 A | 1/2011 |
| JP | 2013-228678 A | 11/2013 |

* cited by examiner

DUPLEX LC COMMUNICATION LIGHT DETECTING ADAPTER AND DUPLEX LC COMMUNICATION LIGHT DETECTING STRUCTURE

The present application is based on Japanese patent application No. 2014-077919 filed on Apr. 4, 2014, the entire contents of which are incorporated herein by reference.

BACKGROUND OF THE INVENTION

1. Field of the Invention

The invention relates to a duplex LC communication light detecting adapter and a duplex LC communication light detecting structure that are adapted to visually check a used/unused state of optical transmission line by detecting a communication light.

2. Description of the Related Art

Optical communication-related equipment uses a communication light detection technique which is adapted to check a used/unused state (hereinafter, referred to as "communication state") of an optical transmission line by detecting a communication light in an invisible light range so as to monitor the steadiness of the optical transmission line or to prevent a man-caused erroneous removal of connector.

As an example of the communication light detection technique, a communication light detection structure is known which is adapted to extract as a leak light a portion of communication light transmitting through the optical transmission line, to receive the leak light by a light-receiving element, to thereby detect whether the communication light is transmitted through the optical transmission line or not, and to output the communication state of the optical transmission line so as to allow the operator's visual check (see e.g. JP-A-2009-145676, JP-A-2010-231082, JP-A-2011-013359 and JP-A-2011-013360).

The communication light detecting structure is provided with a communication light detector having a detector main body mounting a light-receiving element and a communication light detecting adapter having an adapter main body on which a light extraction hole for extracting leak light toward the light-receiving element is formed.

In general, a simplex SC (SSC) connector for single core is used for optical communication. Thus, a simplex SC communication light detecting adapter compatible therewith is used for detecting the communication light.

SUMMARY OF THE INVENTION

The simplex SC communication light detecting adapter may not be suitable for high-density packaging which is needed along with increase in information capacity in recent years. Thus, a duplex LC communication light detecting adapter compatible with a duplex LC (DLC) connector for two cores is demanded so as to form two optical transmission lines by one adaptor.

Furthermore, for checking the communication state of the optical transmission lines using the duplex LC communication light detecting adapter, there is a need for individually checking the communication states of the optical transmission lines to identify transmission of communication light in a specific optical transmission line.

It is an object of the invention to provide a duplex LC communication light detecting adapter and a duplex LC communication light detecting structure that are compatible with duplex LC connector to thereby form two optical transmission lines and allow the individual check of the communication state of the two optical transmission lines.

(1) According to one embodiment of the invention, a duplex LC communication light detecting adapter for forming two parallel optical transmission lines therein when a duplex LC connector is inserted so as to extract as a leak light a portion of communication light transmitting through the optical transmission lines, comprises an adapter main body that is opaque to light, wherein the adaptor main body comprises:

a first space defined by a first wall and isolated from other spaces to arrange a first optical transmission line of the two optical transmission lines;

a first light extraction hole for extracting the leak light from the first space;

a second space defined by a second wall and isolated from other spaces to arrange a second optical transmission line of the two optical transmission lines; and a second light extraction hole for extracting the leak light from the second space.

In the above embodiment (1) of the invention, the following modifications and changes can be made.

(i) The duplex LC communication light detecting adapter further comprises:

a first light reflecting layer formed on the first wall; and
a second light reflecting layer formed on the second wall.

(ii) The first and second light reflecting layers each comprise a metal layer or a deposited metal layer.

(iii) The adapter main body has a rectangular cuboid shape, and wherein the first and second light extraction holes are formed on opposite side surfaces of the adapter main body.

(2) According to another embodiment of the invention, a duplex LC communication light detecting structure comprises:

the duplex LC communication light detecting adapter according to the embodiment (1); and a communication light detector comprising a first light-receiving element to be inserted into the first light extraction hole and a second light-receiving element to be inserted into the second light extraction hole.

In the above embodiment (2) of the invention, the following modifications and changes can be made.

(iv) The first and second light extraction holes share a same through-hole, and wherein the first space is separated from the second space by a partition wall comprising a light-receiving substrate that mounts the first light-receiving element on one surface and the second light-receiving element on another surface.

(v) The first and second light extraction holes share a same through-hole, and wherein the first space is separated from the second space by a partition wall comprising a partitioning plate disposed between the first and second light-receiving elements.

(vi) The adapter main body further comprises a guide groove for positioning the partition wall.

EFFECTS OF THE INVENTION

According to one embodiment of the invention, a duplex LC communication light detecting adapter and a duplex LC communication light detecting structure can be provided that are compatible with the duplex LC connector to thereby form two optical transmission lines and the individual check of the communication state of the two optical transmission lines.

BRIEF DESCRIPTION OF THE DRAWINGS

Next, the present invention will be explained in more detail in conjunction with appended drawings, wherein.

DETAILED DESCRIPTION OF THE PREFERRED EMBODIMENT

A preferred embodiment of the invention will be described below in conjunction with the appended drawings.

Firstly, a duplex LC communication light detecting adapter will be described.

Figure 1:
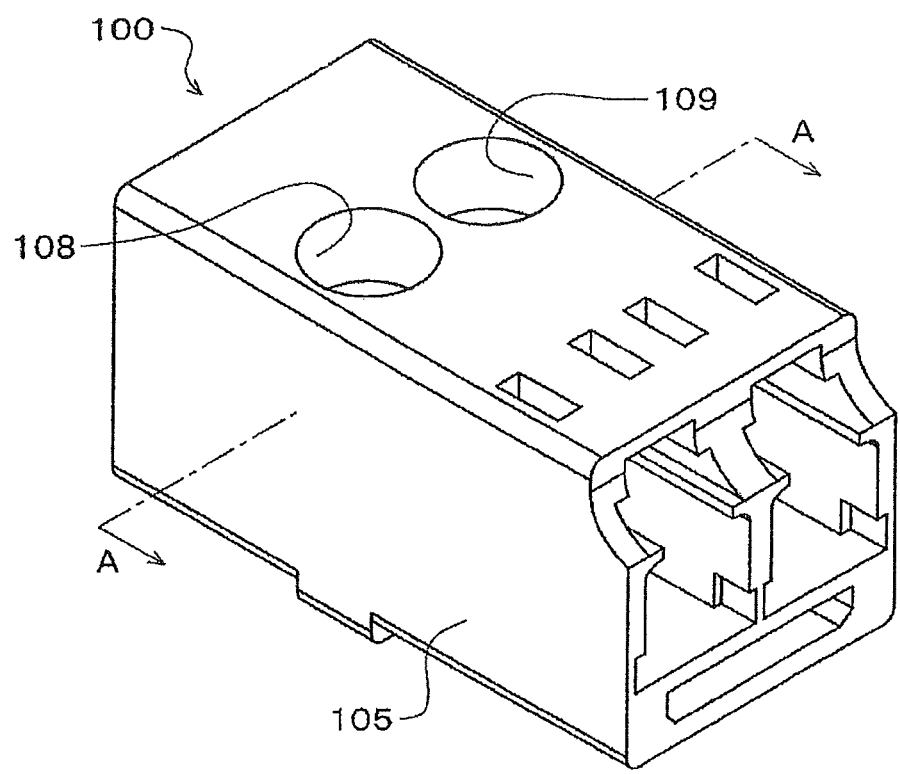
FIG. 1 is a perspective view showing a duplex LC communication light detecting adapter of the present invention.
Figure 2:
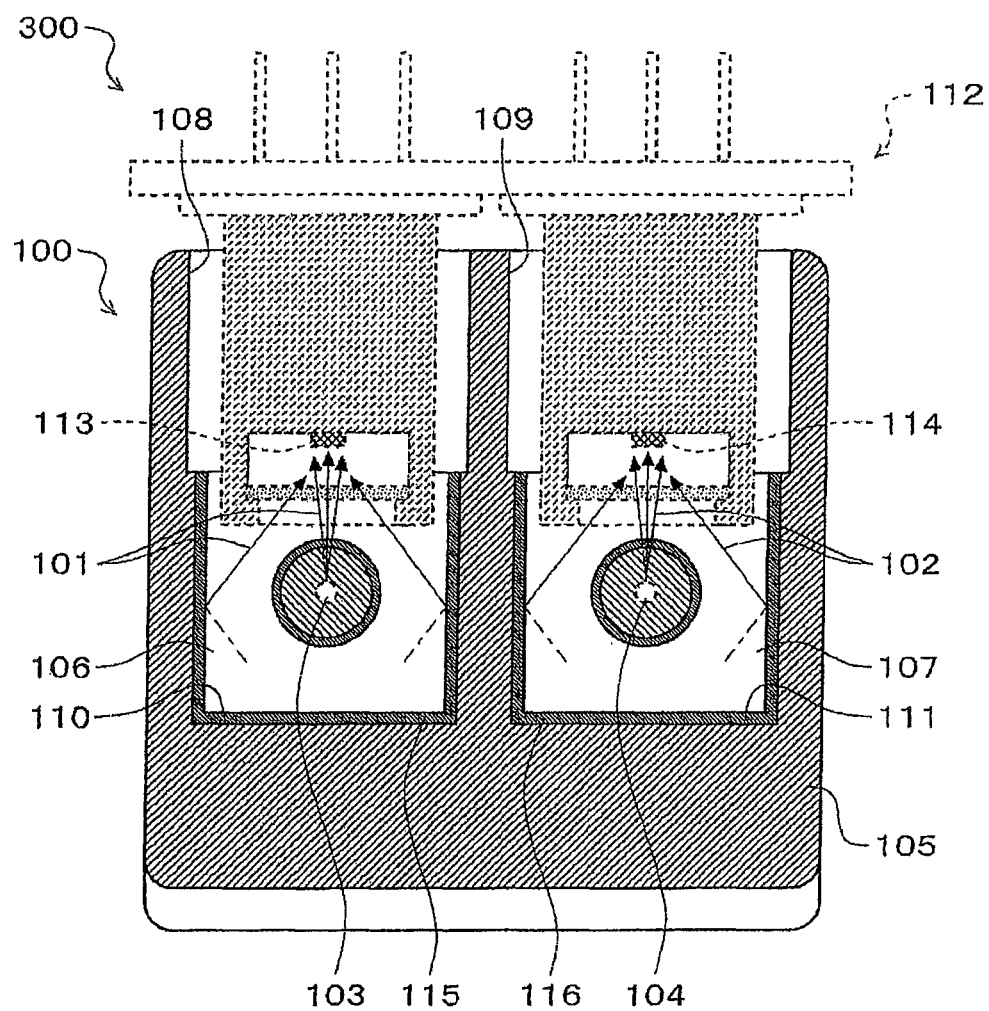
FIG. 2 is an A-A line cross sectional view showing the duplex LC communication light detecting adapter of the invention.

As shown in FIGS. 1 and 2, a duplex LC communication light detecting adapter 100 in the preferred embodiment of the invention is configured that a first optical transmission line 103 and a second optical transmission line 104 are formed therein when duplex LC connectors are inserted, a portion of communication light transmitting through the first optical transmission line 103 is extracted as a first leak light 101 and a portion of communication light transmitting through the second optical transmission line 104 is extracted as a second leak light 102. The duplex LC communication light detecting adapter 100 is provided with an adapter main body 105 which is opaque to light.

The first leak light 101 here means light which is a portion of communication light transmitting through the first optical transmission line 103 and is extracted to the outside of the first optical transmission line 103 through a light extraction portion formed in the midway of the first optical transmission line 103, and the second leak light 102 here means light which is a portion of communication light transmitting through the second optical transmission line 104 and is extracted to the outside of the second optical transmission line 104 through a light extraction portion formed in the midway of the second optical transmission line 104.

As the light extraction portion, it is possible to use a known structure, e.g., a light detecting groove disclosed in JP-A-2009-145676, JP-A-2010-231082 and JP-A-2011-013359 or an off-axis portion disclosed in JP-A-2013-228678 but the detailed description thereof will be omitted herein.

In addition, the adapter main body 105 opaque to light means that the adapter main body 105 functions as a kind of light filter because of e.g., being formed of a light-absorbing material and has no optical transparency.

The duplex LC communication light detecting adapter 100 is formed by modifying a duplex LC adapter which is used for connecting duplex LC connectors, etc. In many cases, plural duplex LC communication light detecting adapters 100 are mounted on, e.g., a rack panel used in an optical communication-related equipment.

The adapter main body 105 is formed in a rectangular cuboid shape and has a first space 106 for arranging the first optical transmission line 103, a second space 107 for arranging the second optical transmission line 104, a first light extraction hole 108 for extracting the first leak light 101 from the first space 106 and a second light extraction hole 109 for extracting the second leak light 102 from the second space 107.

The first space 106 is defined by a first wall 110 and isolated from other spaces. The second space 107 is defined by a second wall 111 and isolated from other spaces.

The first light extraction hole 108 has a function of shielding a first light-receiving element 113 mounted on a communication light detector 112 from external light when the first light-receiving element 113 is fitted and attached thereto, thereby preventing the first light-receiving element 113 from receiving external light and the communication state of the first optical transmission line 103 from being checked incorrectly when the communication light detector 112 is attached to the duplex LC communication light detecting adapter 100.

The second light extraction hole 109 has a function of shielding a second light-receiving element 114 mounted on the communication light detector 112 from external light when the second light-receiving element 114 is fitted and attached thereto, thereby preventing the second light-receiving element 114 from receiving external light and the communication state of the second optical transmission line 104 from being checked incorrectly when the communication light detector 112 is attached to the duplex LC communication light detecting adapter 100.

In order to individually check the communication state of the first optical transmission line 103 and that of the second optical transmission line 104, it is required that the first light-receiving element 113 receives only the first leak light 101 and the second light-receiving element 114 receives only the second leak light 102.

In this respect, the duplex LC communication light detecting adapter 100 is provided with the adapter main body 105 which is opaque to light. Therefore, in the duplex LC communication light detecting adapter 100, the first space 106 and the second space 107 are optically isolated from each other and are also optically isolated from other spaces in which external light is present.

Therefore, there is no possibility that the first leak light 101 extracted from the first optical transmission line 103 reaches the second space 107 and is received by the second light-receiving element 114, or that the second leak light 102 extracted from the second optical transmission line 104 reaches the first space 106 and is received by the first light-receiving element 113, or that external light present in other spaces reaches the first space 106 or the second space 107 and is received by the first light-receiving element 113 or the second light-receiving element 114.

This allows the first light-receiving element 113 to receive only the first leak light 101 and the second light-receiving element 114 to receive only the second leak light 102. Therefore, interference (crosstalk) of the first leak light 101 with the second leak light 102 or interference of the first leak light 101 or the second leak light 102 with external light does not occur and it is thus possible to individually, accurately check the communication state of the first optical transmission line 103 and that of the second optical transmission line 104.

In the meantime, a distance between the first optical transmission line 103 and the second optical transmission line 104 is as very small as 6.25 mm so as to conform with the LC connector standard. Therefore, the first light-receiving element 113 and the second light-receiving element 114 need to be small in size so that the first leak light 101 and the second leak light 102 are separately receive by the first light-receiving element 113 and the second light-receiving element 114 which are arranged in parallel.

However, when the first light-receiving element 113 and the second light-receiving element 114 are small in size, a light-receiving area is reduced according to the size and this causes a decrease in light-receiving sensitivity. Therefore, when the first leak light 101 and the second leak light 102 are absorbed by the adapter main body 105 formed of a light-absorbing material and light intensity is reduced, it may not be possible to accurately check the communication state of the first optical transmission line 103 and that of the second optical transmission line 104 depending on the extent of the decrease in light intensity.

Considering this point, the duplex LC communication light detecting adapter 100 is preferably further provided with a first light reflecting layer 115 formed on the first wall 110 and a second light reflecting layer 116 formed on the second wall 111.

The first light reflecting layer 115 has a function of reflecting the first leak light 101 which is emitted spherically from a light extraction portion, and the first leak light 101 is thereby collected toward the first light-receiving element 113. Also, the second light reflecting layer 116 has a function of reflecting the second leak light 102 which is emitted spherically from a light extraction portion, and the second leak light 102 is thereby collected toward the second light-receiving element 114.

Thus, even when the adapter main body 105 is opaque to light, i.e., even when the adapter main body 105 is formed of a light-absorbing material, the first leak light 101 and the second leak light 102 are reflected by the first light reflecting layer 115 and the second light reflecting layer 116 and respectively reach the first light-receiving element 113 and the second light-receiving element 114 without being absorbed by the adapter main body 105.

Therefore, a decrease in intensity of the first leak light 101 reaching the first light-receiving element 113 and a decrease in intensity of the second leak light 102 reaching the second light-receiving element 114 do not occur and this allows the communication state of the first optical transmission line 103 and that of the second optical transmission line 104 to be checked more accurately.

The first light reflecting layer 115 and the second light reflecting layer 116 preferably comprise a metal layer or a deposited metal layer. This allows the first light reflecting layer 115 and the second light reflecting layer 116 to be easily formed on the adapter main body 105 formed of a molded resin.

Since the adapter main body 105 is opaque to light and the first space 106 for arranging the first optical transmission line 103 and the second space 107 for arranging the second optical transmission line 104 are optically isolated from each other and are also optically isolated from other spaces in which external light is present as described above, the duplex LC communication light detecting adapter 100 is compatible with duplex LC connector, thus allows the first optical transmission line 103 and the second optical transmission line 104 to be formed and also allows the communication state of the first optical transmission line 103 and that of the second optical transmission line 104 to be individually checked.

Figure 3:
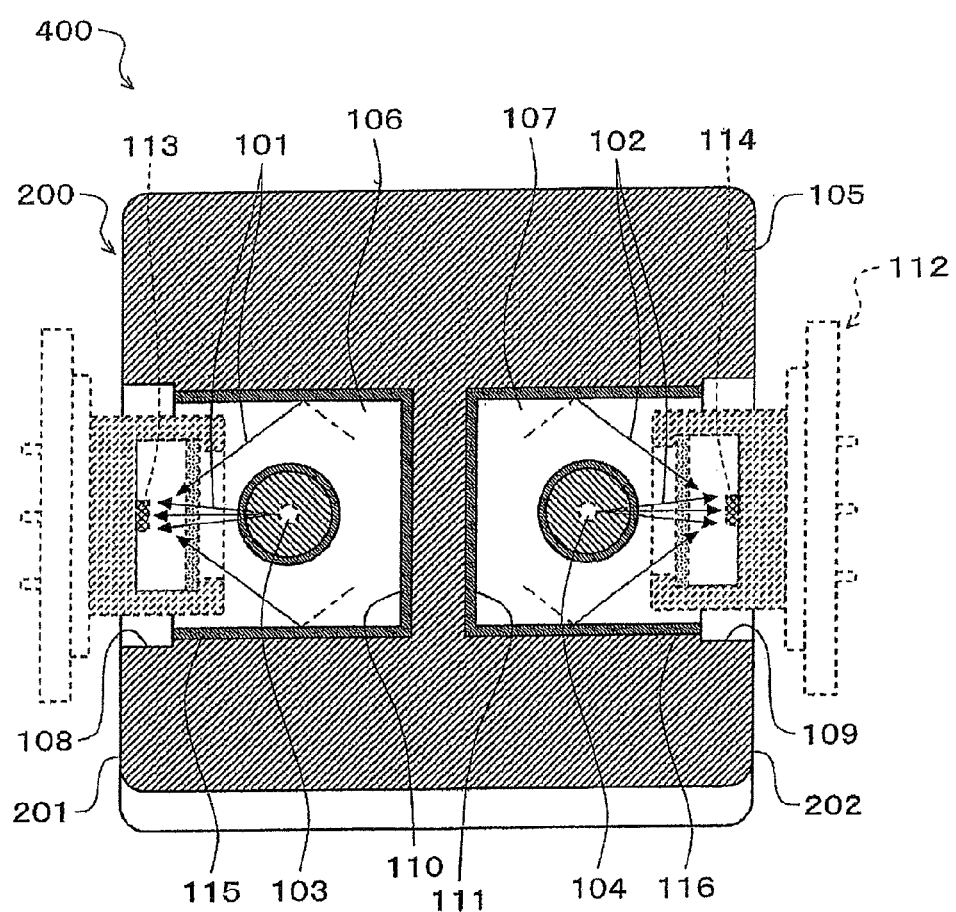
FIG. 3 is an A-A line cross sectional view showing a duplex LC communication light detecting adapter of the invention.

The embodiment described above is only one specific example of the invention and various changes can be made without departing from the gist of the invention. For example, although an example in which the first light-receiving element 113 and the second light-receiving element 114 arranged in parallel are fitted and attached on the same surface (upper surface in the drawings) has been described herein, the invention may be embodied as a duplex LC communication light detecting adapter 200 in which the first light extraction hole 108 and the second light extraction hole 109 are formed on opposite side surfaces 201 and 202 of the adapter main body 105 so that the first light-receiving element 113 and the second light-receiving element 114 are fitted and attached on different surfaces, as shown in FIG. 3.

Since this allows the first light-receiving element 113 and the second light-receiving element 114 to be selected with a certain degree of freedom without calculating the distance between the first optical transmission line 103 and the second optical transmission line 104, it is possible to use light-receiving elements having a larger light-receiving area and higher light-receiving sensitivity.

A duplex LC communication light detecting structure 300 or 400 is formed by attaching the communication light detector 112 to the duplex LC communication light detecting adapter 100 or 200.

Next, a duplex LC communication light detecting structure will be described.

Figure 4:
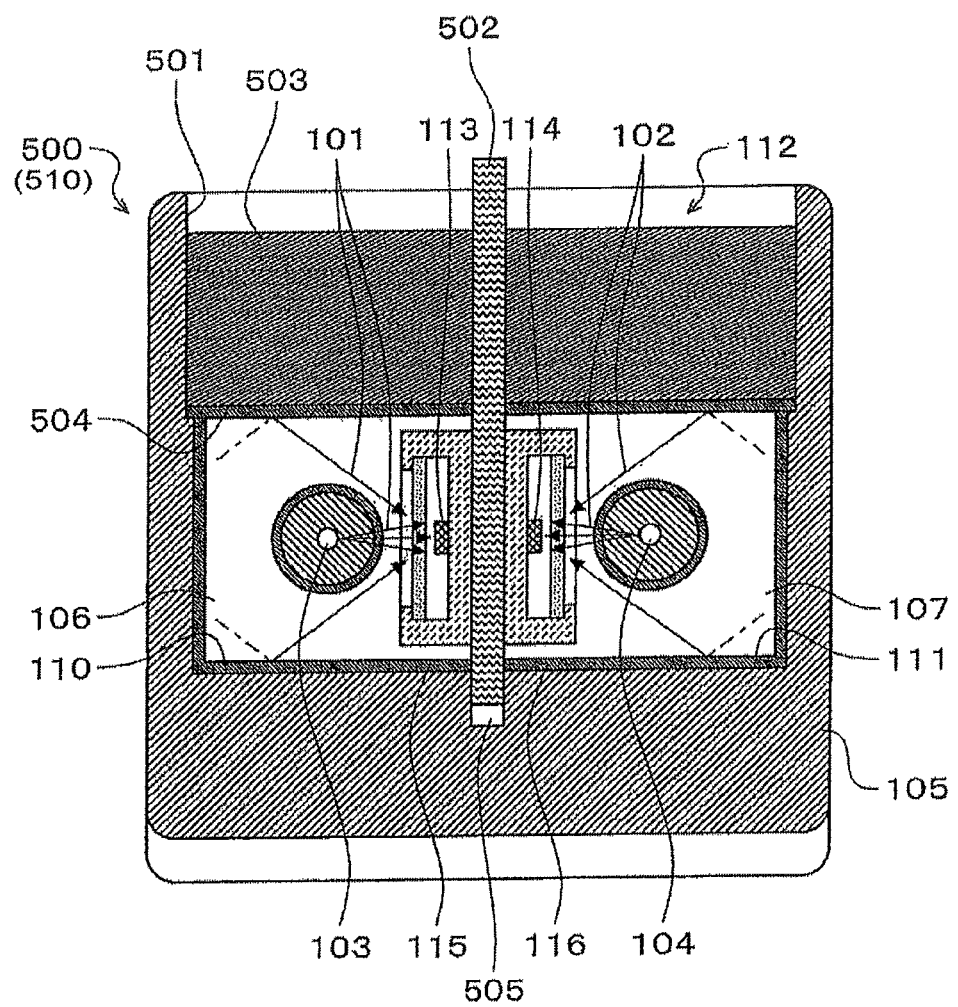
FIG. 4 is an A-A line cross sectional view showing a duplex LC communication light detecting structure of the invention.

As shown in FIG. 4, a duplex LC communication light detecting structure 500 in the preferred embodiment of the invention is provided with a duplex LC communication light detecting adapter 510 and the communication light detector 112 which has the first light-receiving element 113 to be fitted and attached to the first light extraction hole 108 and the second light-receiving element 114 to be fitted and attached to the second light extraction hole 109.

The duplex LC communication light detecting adapter 510 is different from the duplex LC communication light detecting adapter 100 in that the a single through-hole 501 constitutes the first light extraction hole 108 and the second light extraction hole 109, and a partition wall 502 dividing the first space 106 from the second space 107 is formed of a light-receiving substrate which mounts the first light-receiving element 113 on one surface and the second light-receiving element 114 on another surface.

The communication light detector 112 is further provided with a lid 503 formed integrally with the light-receiving substrate to close the through-hole 501 and a third light reflecting layer 504 formed on the lid 503.

Here, the adapter main body 105 is preferably further provided with a guide groove 505 for positioning the partition wall 502. This allows the communication light detector 112 to be easily positioned with respect to the duplex LC communication light detecting adapter 510.

Figure 5:
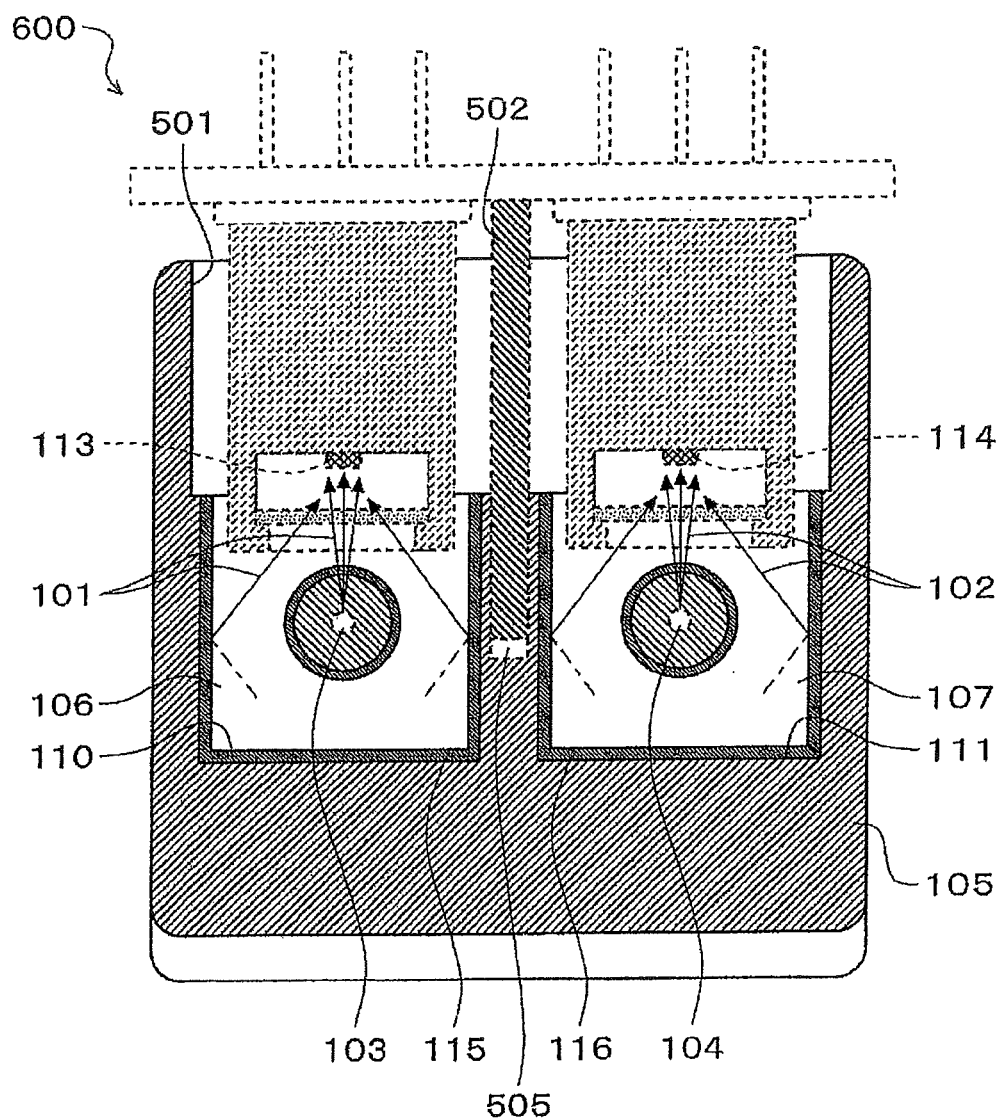
FIG. 5 is an A-A line cross sectional view showing a duplex LC communication light detecting structure of the invention.

The invention may be also embodied as a duplex LC communication light detecting structure 600 in which single through-hole 501 constitutes the first light extraction hole 108 and the second light extraction hole 109, and the partition wall 502 dividing the first space 106 from the second space 107 is formed of a partitioning plate present between the first light-receiving element 113 and the second light-receiving element 114, as shown in FIG. 5.

Figure 6:
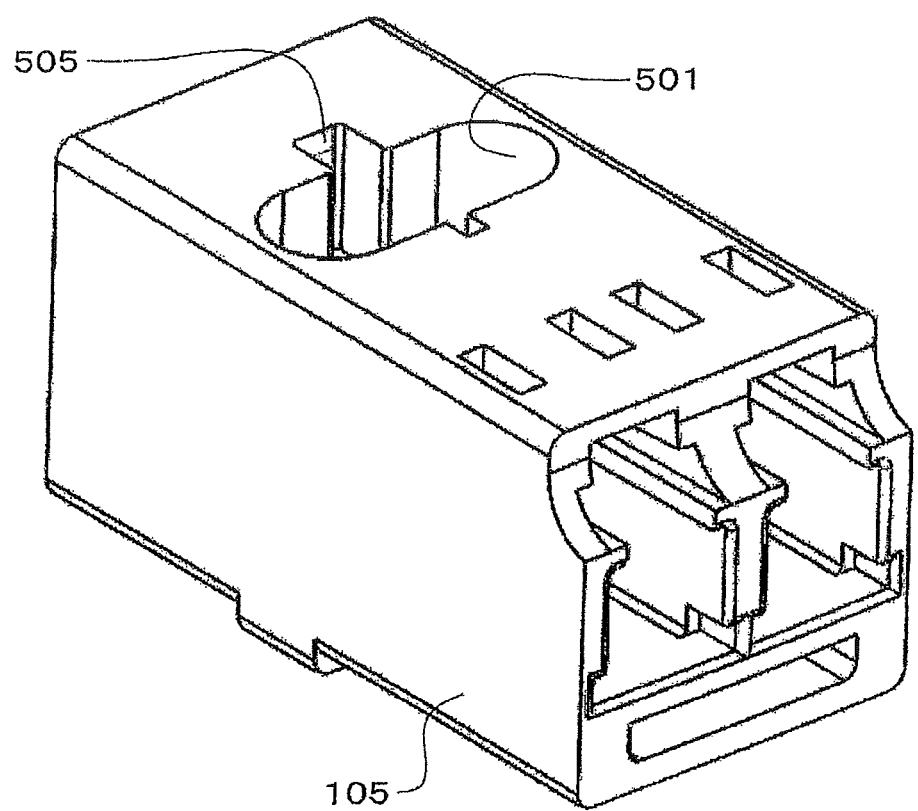
FIG. 6 is a perspective view showing a duplex LC communication light detecting adapter of the invention.

In this case, the thickness of the partition wall 502 and the width of the guide groove 505 are preferably made non-uniform as shown in FIG. 6 so that the first light-receiving element 113 is fitted and attached to only the first light extraction hole 108 and the second light-receiving element 114 fitted and attached to only the second light extraction hole 109. As a result, it is possible to prevent the first light-receiving element 113 from being fitted and attached to the second light extraction hole 109 and the second light-receiving element 114 from being fitted and attached to the first light extraction hole 108, and thereby to prevent the communication state of the first optical transmission line 103 and that of the second optical transmission line 104 from being checked the other way around.

The partition wall 502 in each structure is preferably formed of a material excellent in light shielding property and mechanical strength, e.g., a metal. This allows light to be sufficiently blocked between the first space 106 and the second space 107 and also allows the communication light detector 112 to be certainly positioned.

As described above, according to the invention, it is possible to provide a duplex LC communication light detecting adapter and a duplex LC communication light detecting structure which are compatible with duplex LC connector, allow two optical transmission lines to be formed and also allow communication states of the two optical transmission lines to be individually checked.

What is claimed is:

1. A duplex LC communication light detecting adapter for forming two parallel optical transmission lines therein when a duplex LC connector is inserted so as to extract as a leak light a portion of communication light transmitting through the optical transmission lines, comprising, an adapter main both that is opaque to light,
    wherein the adapter main body comprises:
        a first place defined by a first wall and isolated from other spaces to arrange a first optical transmission line of the two optical transmission lines:
        a first light extraction hole for extracting the leak light from the first space:
        a second space defined by a second wall and isolated from other spaces to arrange a second optical transmission line of the two optical transmission lines; and
        a second tight extraction hole for extracting the leak light from the second space,
    further comprising:
    a first light reflecting layer formed on the first wall; and
    a second light reflecting layer formed on the second wall.

2. The duplex LC communication light detecting adapter according to claim 1, wherein the first and second light reflecting layers each comprise a metal layer or a deposited metal layer.

3. A duplex LC communication light detecting adapter for forming two parallel optical transmission lines therein when a duplex LC connector is inserted so as to extract as a leak light a portion of communication light transmitting through the optical transmission lines, comprising an adapter main body that is opaque to light,
    wherein the adapter main body comprises:
        a first space defined by a first wall and isolated from other spaces to arrange a first optical transmission line of the two optical transmission lines:
        a first light extraction hole for extracting the leak light from the first space:
        a second space defined by a second wall and isolated from other spaces to arrange a second optical transmission line of the two optical transmission lines; and
        a second light extraction hole for extracting the leak light from the second space,
    wherein the adapter main body has a rectangular cuboid shape, and
    wherein the first and second light extraction holes are formed on opposite side surfaces of the adapter main body.

4. A duplex LC communication light detecting structure, comprising:
    a duplex LC communication light detecting adapter for forming two parallel optical transmission lines therein when a duplex LC connector is inserted so as to extract as a leak a portion of communication light transmitting through the optical transmission lines, comprising an adapter main body that is opaque to light,
    wherein the adapter main body comprises:
        a first space defined by a first wall and isolated from other so spaces to arrange a first optical transmission line of the two optical transmission lines:
        a first light extraction hole for extracting the leak light from the first space:
        a second space defined by a second wall and isolated from other spaces to arrange a second optical transmission line of the two optical transmission lines; and
        a second light extraction hole for extracting the leak light from the second space; and
    a communication light detector comprising a first light-receiving element to be inserted into the first light extraction hole and a second light-receiving element to be inserted into the second light extraction hole.

5. The duplex LC communication light detecting structure according to claim 4, wherein the first and second light extraction holes share a same through-hole, and
    wherein the first space is separated from the second space by a partition wall comprising a light-receiving substrate that mounts the first light-receiving element on one surface and the second light-receiving element on another surface.

6. The duplex LC communication light detecting structure according to claim 4, wherein the first and second light extraction holes share a same through-hole, and
    wherein the first space is separated from the second space by a partition wall comprising a partitioning plate disposed between the first and second light-receiving elements.

7. The duplex LC communication light detecting structure according to claim 5, wherein the adapter main body further comprises a guide groove for positioning the partition wall.

8. The duplex LC communication light detecting structure according to claim 6, wherein the adapter main body further comprises a guide groove for positioning the partition wall.

* * * * *